I. D. JEWETT.
GATE.
No. 191,151. Patented May 22, 1877.
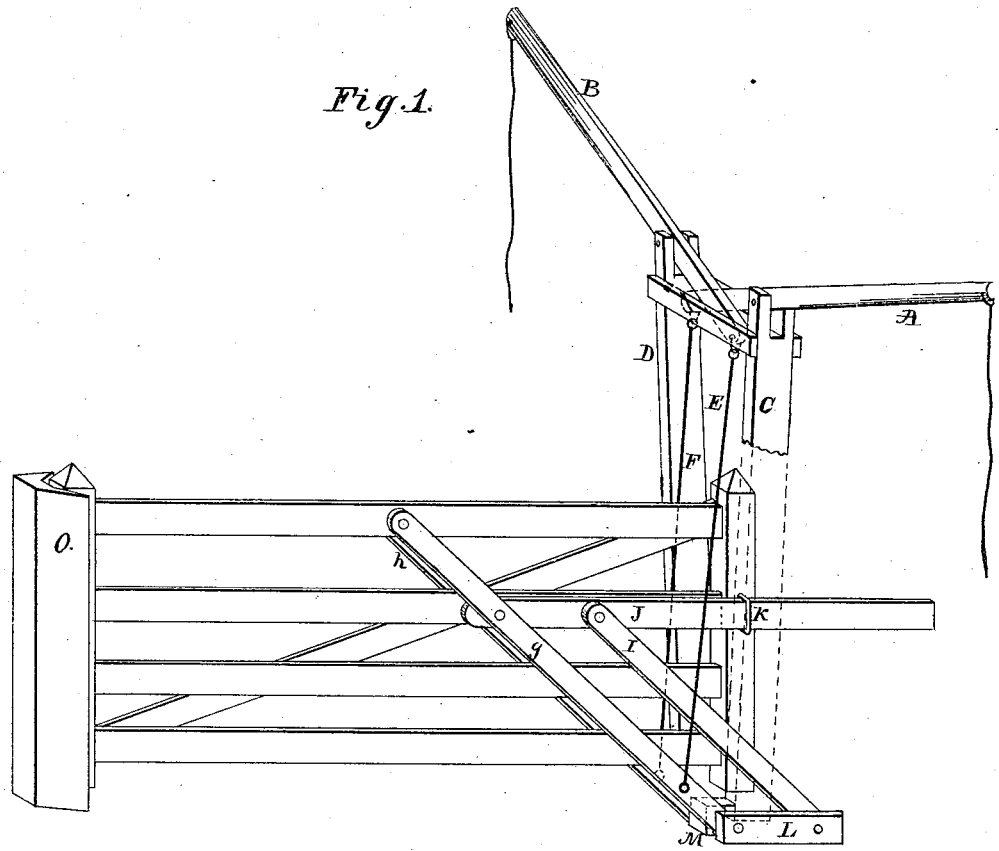
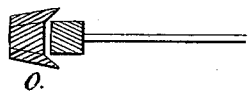
Witnesses
Alfred G. Thompson
Jessup Pope
Inventor:
Israel D. Jewett

UNITED STATES PATENT OFFICE.

ISRAEL D. JEWETT, OF ST. OMER, INDIANA.

IMPROVEMENT IN GATES.

Specification forming part of Letters Patent No. 191,151, dated May 22, 1877; application filed November 22, 1876.

*To all whom it may concern:*

Be it known that I, ISRAEL D. JEWETT, of St. Omer, in the county of Decatur and State of Indiana, have invented a new and Improved Gate; and I do hereby declare that the following is a full, clear, and exact description of the same.

This invention is an improvement in the class of gates which are supported by parallel pivoted bars and operated by levers, so that in being opened or closed they move in a vertical plane and in the arc of a circle.

The improvement relates to the use of a horizontal bar or lever, to which the bars supporting the gate are pivoted, and whose function is to assist in maintaining the gate in a horizontal position, as hereinafter described.

In the accompanying drawing, Figure 1 is a side view of the gate closed. Figs. 2 and 3 are detail views.

The gate proper is constructed in the ordinary manner, and arranged to move in a vertical plane between two posts, D C, which are set vertical and parallel.

The means for supporting the gate consist of inclined parallel bars $g$ I and a horizontal bar or lever, J. The bars $g$ I are pivoted to base-blocks L M, also to the horizontal bar J; and the bar $g$ is extended and pivoted to the gate at $h$. The right-hand end of the bar or lever J passes through a staple, K, attached to the rear end of the gate.

By this conjunction and arrangement of parts the gate is firmly supported in horizontal position when closed or open, also when being shifted from one position to the other.

In the shifting movement the lever slides through the staple K, which thus serves as a guide. The result is practically the same as if the distance between the supporting-bars $g$ and I were the same as between the guide K and bar $g$. In other words, the use of the bar J is to increase the leverage between the gate and the pivotal supports.

The devices for moving or shifting the gate consist of levers A B, pivoted to the top of posts C D and rods E F, connecting them with the inclined bar $g$.

The latch-post O is provided with a vertical channel, to receive the end of the gate when closed, as shown.

What I claim is—

The combination of the sliding bar J and guide K with the gate and its supporting-bars $g$ I, the latter being pivoted in the manner shown and described.

ISRAEL D. JEWETT.

Witnesses:
ALFRED G. THOMPSON,
JESSE P. POPE.